United States Patent [19]

Struger et al.

[11] Patent Number: 5,089,984
[45] Date of Patent: Feb. 18, 1992

[54] ADAPTIVE ALARM CONTROLLER CHANGES MULTIPLE INPUTS TO INDUSTRIAL CONTROLLER IN ORDER FOR STATE WORD TO CONFORM WITH STORED STATE WORD

[75] Inventors: Odo J. Struger, Chagrin Falls; Edward J. Klimas, Lyndhurst, both of Ohio

[73] Assignee: Allen-Bradley Company, Inc., Milwaukee, Wis.

[21] Appl. No.: 352,189

[22] Filed: May 15, 1989

[51] Int. Cl.$^5$ ............................. G06F 11/30
[52] U.S. Cl. ........................ 395/650; 364/185; 364/148; 364/916; 364/916.2; 364/920; 364/921.8; 364/939.2; 364/939.6; 364/211.1; 364/221; 364/221.4; 364/221.7; 364/221.9; 364/DIG. 1; 364/DIG. 2
[58] Field of Search ... 364/200 MS File, 900 MS File, 364/185, 148

[56] References Cited

U.S. PATENT DOCUMENTS

| | | | |
|---|---|---|---|
| 3,334,334 | 8/1967 | Halpin | 364/200 |
| 3,344,406 | 9/1967 | Vinal | 364/900 |
| 4,290,105 | 9/1981 | Cichelli et al. | 364/200 |
| 4,488,220 | 12/1984 | Friedli et al. | 364/200 |
| 4,517,637 | 5/1985 | Cassell | 364/138 |
| 4,562,529 | 12/1985 | Drummond | 364/140 |
| 4,633,390 | 12/1986 | Yoshida | 364/200 |
| 4,642,760 | 2/1987 | Yanai et al. | 364/200 |
| 4,663,725 | 5/1987 | Truckenbrod et al. | 364/505 |
| 4,764,863 | 8/1988 | Silverthorn, III et al. | 364/200 |
| 4,858,147 | 8/1989 | Conwell | 364/513 |
| 4,873,687 | 10/1989 | Breu | 371/8.2 |
| 4,884,217 | 11/1989 | Skeirik et al. | 364/513 |
| 4,963,909 | 10/1990 | Fukai | 364/200 |

OTHER PUBLICATIONS

Article: "Content-Addressable Memory Does Fast Matching", by Dave Bursky, Electronic Design, Dec. 8, 1988.

Primary Examiner—Thomas C. Lee
Assistant Examiner—Mehmet Geckil
Attorney, Agent, or Firm—Quarles & Brady

[57] ABSTRACT

An industrial controller monitors its state as comprised of selected inputs and outputs for a present time period and a previous time period. Each current state is compared to a previously acquired list of stored states to detect possible errors in inputs to the industrial controller and to find the closest match of the current state to a previously stored state. This "closest match word" is used to identify erroneous inputs to the industrial controller and to determine whether the controlled process must be halted. The closest match word may be substituted for the current state to permit the controlled process to continue.

3 Claims, 10 Drawing Sheets

ALARM MODULE

MAIN ALARM
MODULE PROGRAM

TRANSITION DETECTOR ROUTINE

BUFFER ROUTINE

LEARN MODE
ROUTINE

ALARM MODE ROUTINE

ALARM SERVICE ROUTINE

ADAPTIVE ALARM CONTROLLER CHANGES MULTIPLE INPUTS TO INDUSTRIAL CONTROLLER IN ORDER FOR STATE WORD TO CONFORM WITH STORED STATE WORD

This application relates to industrial controllers and more particularly to an alarm unit for detecting and correcting errors in the signals processed by such controllers.

Industrial controllers are typically connected to industrial equipment such as assembly lines or machine tools to operate such equipment in response to signals received by the controller and processed by a stored logic program within the controller. Inputs to the controller may be discrete binary signals such as from switches which may detect limits of motion, temperature, time, or other continuously variable quantities, or the inputs may be analog measures of the quantities themselves which are generally then converted to digital binary form for processing.

Likewise, the outputs of the controller may be either binary outputs as implemented by mechanical or solid-state relays, or analog outputs produced by means of a digital to analog converter.

As mentioned, the controller executes a stored logic program to process the inputs it receives and to produce the appropriate outputs. In general the outputs of the controller are a function of both the current inputs and the previous values of the inputs as stored in the controller's memory. The inputs to the controller, in turn, depend on the present status of the equipment controlled. Together, the inputs and outputs of the controller and the previous inputs and outputs of the controller may be considered variables which define the process's "state".

In a typical multi-step discrete process there are many possible combinations of inputs and outputs and therefore many possible controller states. Not all possible states, however, are encountered during the normal operation of a given process being controlled. The states not encountered in normal operation are termed "illegal" because they indicate abnormal or unanticipated operation of the process or failure of the control system itself.

Identification of illegal states is therefore desirable for three reasons: First, the occurrence of an illegal state may indicate a failure of the control system—either the controller itself or the sensors providing the inputs to the controller. Second, the illegal state may indicate an unanticipated process variation to which an operator should be alerted. Third, the occurrence of an illegal state may be used to actuate an alternative control structure making use of redundant sensors if there is an erroneous input.

Identifying an exhaustive list of illegal states may be impossible in a complex control system. As a result, in critical processes where error cannot be tolerated, alternatives may be adopted including the use of redundant control systems or continuous human supervision of the process.

SUMMARY OF THE INVENTION

The present invention relates to an alarm controller which monitors the inputs and outputs of a controller to determine and detect illegal system states.

It is a general object of the invention to provide a self-teaching or heuristic system for determining the illegal states in a control system. During an initial LEARN mode, a content addressable memory stores and orders each state presented during the learning period. These states are examined during the non-learning, ALARM mode, to identify potentially illegal states.

It is another object of the invention to allow a current state to be defined by both the current input and output bit patterns and a predetermined number of previous input and output bit patterns. The last n bit patterns are placed in a rotating buffer and combined with the present bit patterns to define each of the states as stored in the content addressable memory.

It is another object of the invention to permit the detection of illegal states in a control system with asynchronous input bit transitions. Each input monitor line connects to a transition detector which triggers the state learning or state evaluation process.

It is yet another object of the invention to provide operator editing of the list of illegal states. During the ALARM mode, the illegal state is displayed to the operator allowing the operator to change the particular illegal state to a legal state if its occurrence is of no consequence.

It is yet a further object of the invention to provide the operator with a readout of the illegal state which identifies the individual erroneous inputs and output values, as determined from the closest match to a legal state, to allow the operator to identify possible input sensor failure and to possibly cancel temporarily the effect of that erroneous input.

It is another object of the invention to allow the selection from among several redundant input sources in the event of the failure of a single input source. Groups of redundant inputs are identified by the operator. When a failed input is detected, it is flagged internally as a "don't care" input to allow continued operation of the process.

The foregoing and other objects and advantages of the invention will appear from the following description In the description, reference is made to the accompanying drawings which form a part hereof and in which there is shown by way of illustration, a preferred embodiment of the invention. Such embodiment does not necessarily represent the full scope of the invention, however, and reference is made therefore to the claims herein for interpreting the scope of the invention.

GENERAL DESCRIPTION OF THE INVENTION

Figure 6:
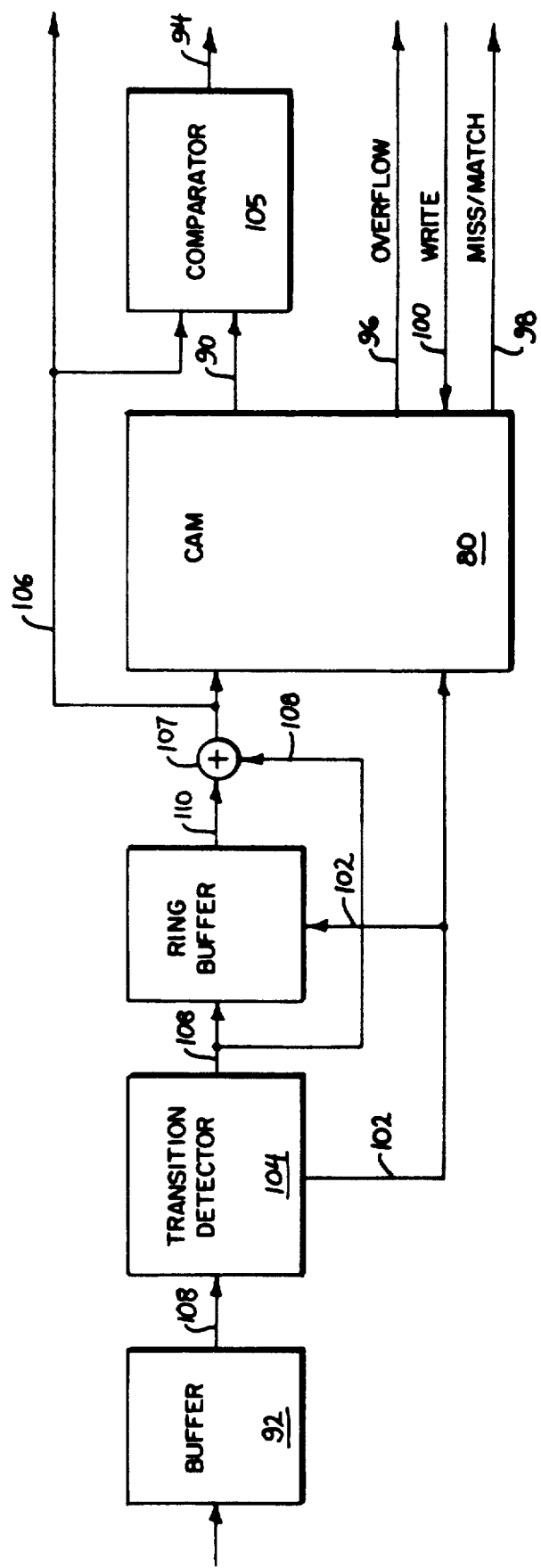
FIG. 6 is a functional block diagram of the alarm module used to explain its operation.

Before describing the preferred embodiment of the invention, the alarm module will be described generally from a functional standpoint. Referring to FIG. 6, the functional blocks of the alarm module are shown. A bus buffer 92, collects the 16 current I/O status bits and forms the bits into a 16-bit status word indicated by arrow 108. The status bits, to be described in more detail below, are selected by the operator for relationship to one another and indicate the state of various inputs and outputs to and from the industrial controller. Ideally the present and previous states of these status bits uniquely define the state of the process being controlled.

The status word 108 is applied to a transition detector 04 which identifies whether any of the bits in the status word 108 have changed since the last status word was received. The transition detector 104 may be implemented with discrete digital circuitry through the use of edge sensitive devices such as monostable multivibrators, or as in the preferred embodiment described below, in software through a logical comparison of successive status words. When a change in any status bit is detected, the transition detector 104, sets a transition flag indicated by arrow 102 which serves to activate a ring buffer 77 and a content addressable memory ("CAM") 80 also to be described in more detail below. The previous status word, as previously collected by the bus buffer 92, is output from the ring buffer 77 as indicated by arrow 110.

The previous status word 110 from the ring buffer 77 and the current status word 108 are concatenated into a single 32-bit state word indicated by arrows 106 at functional block 107 and presented to the CAM 80. The state word 106 identifies a process state. The CAM 80 is capable of storing 256 thousand 32-bit state words; although it will be apparent to one skilled in the art that larger CAM's may be used subject to the constraints of search time. The CAM 80 may be implemented in a variety of ways including optical holographic memory, pattern recognition modules, perceptrons/neural nets, or discrete digital circuitry. In the preferred embodiment the CAM 80 is implemented in software as will be described in detail below.

The CAM 80 differs from conventional memory which accepts an address and returns data reflecting the contents of the memory at that address. The CAM 80 accepts data (a 32-bit state word 106) and returns the address in the CAM 80 of the location containing that 32-bit state word 106. If the state word 106 is not contained within the CAM 80, the CAM 80 provides the address of the state word contained in the CAM 80 which is closest to that presented. What constitutes "closeness" must be pre-defined. The CAM 80 is also termed associative memories and finds general use in pattern recognition applications.

Referring still to FIG. 6, when the 32-bit state word 106, comprised of status word (108) and the previous status word (110), is presented to the CAM 80 along with the transition flag 102 from the transition detector 104, the CAM 80 attempts to find the current state word 106 within its contents and sets a match/miss flag indicated by arrow 98 and a 32-bit closest-match word indicated by arrow 90 which depends on the results of its search. The match/miss flag 98 is logical "true" if there is an exact match of the presented 32-bit state word 106 with a state word stored in the CAM 80, and a logical "zero" if there is no exact match. In the former case, the closest-match word 90 is identical to the presented state word 106. In the latter case, the closest-match word 90 is the word contained in the CAM 80 which is "closest", according to pre-defined rules, to the presented state word 106

The 32-bit state word 106 and the 32-bit closest-match word 90 are compared to each other at comparator functional block 105 to produce an error word shown as arrow 94 which indicates the bits between the state word 106 and the closest-match word 90 that are not identical. The comparator 105 complements each bit in the closest-match word 90 and logically "and"s the result in a bit-wise fashion with each bit in the status word 106. The resulting error word 94 and the match/miss flag 98 are presented to the system controller 16 for subsequent processing according to the mode of the alarm, discussed further below.

A "write" flag 100 returns from the system controller 16 to the CAM 80 so that the system controller 16 may command the CAM 80 to add the present state word 106 to those it has already stored.

The alarm module 27 may operate in one of two modes: the LEARN mode or the ALARM mode as determined and controlled by the system controller 16. In the LEARN mode, the CAM 80 stores the states encountered during a typical process control sequence. In the ALARM mode, these stored states are compared to the states subsequently produced by the operation of the process control sequence to detect state errors.

DETAILED DESCRIPTION OF THE PREFERRED EMBODIMENT

Figure 1:
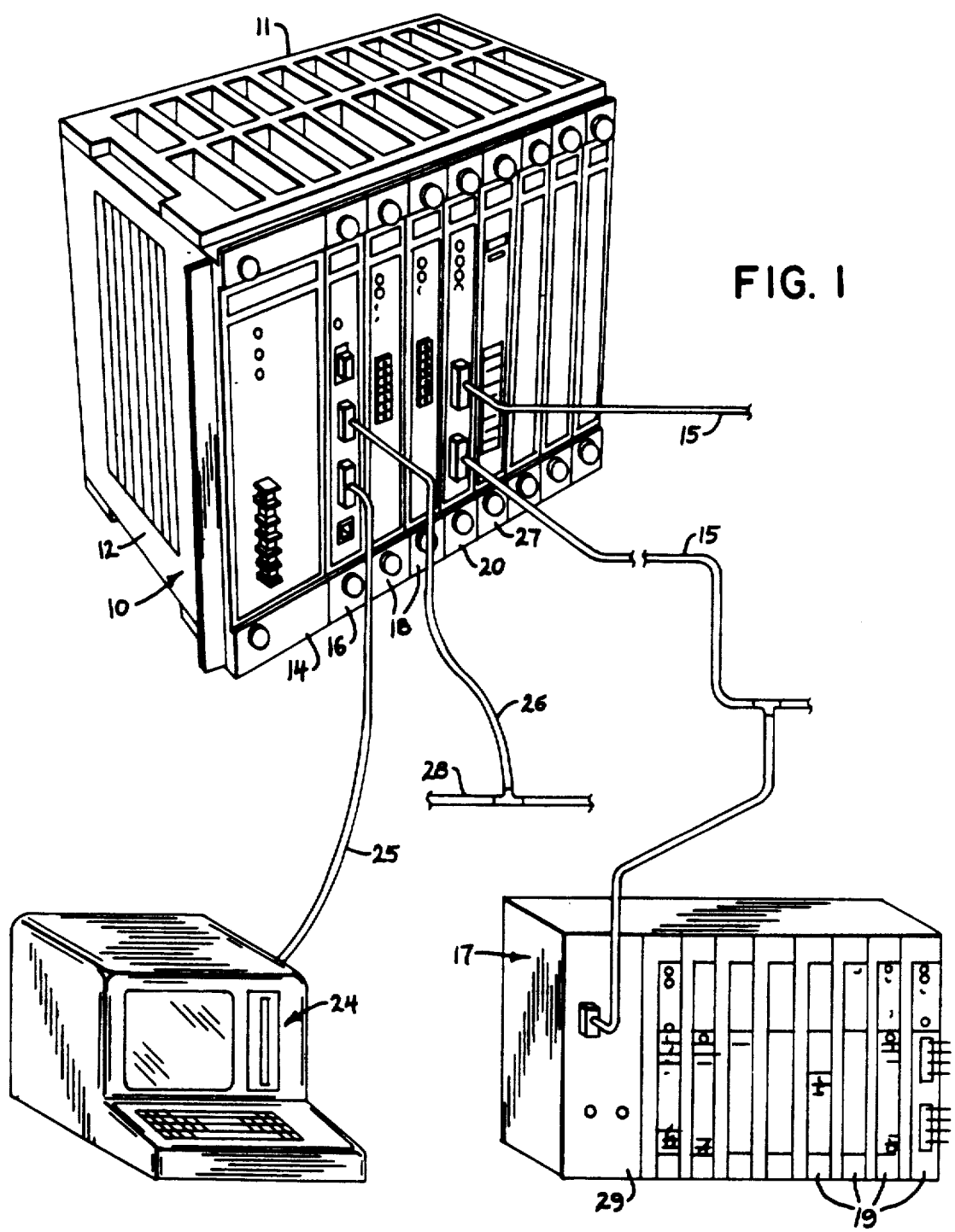
FIG. 1 is a perspective view of an industrial controller employing the present invention.

With initial reference to FIG. 1, a programmable controller 10 of the present invention is housed in a rack 12 which includes a series of slots that receive a plurality of printed circuit board modules. These modules connect to a mother board which extends along the back surface of the rack 12 to provide a backplane 11. The backplane 11 has a plurality of module connectors which are interconnected by a conductive pattern on the backplane. The backplane 11 provides a series of signal buses to which the modules connect. The rack 12 contains a power supply module 14, a system controller 16, a number of program execution processor modules 18, at least one remote input/output (I/O) scanner module 20, and an alarm module 27. The remaining locations in rack 12 are empty and the slots are covered by blank plates until additional functional modules are to be inserted in these slots. The physical construction of the rack 12 is disclosed in U.S. patent application Ser. No. 06/909,710 filed on Sept. 22, 1986, and assigned to the same assignee as the present invention.

Up to four remote I/O Scanner modules 20 may interface the controller 10 to external remote I/O racks 17 via serial I/O data links, such as link 15. Each remote I/O rack 17 has a plurality of local I/O modules 19 which are coupled to individual sensors and actuators on the controlled equipment. The local I/O modules 19 may take many forms and may include, for example, D.C. inputs or outputs, A.C. inputs or outputs, analog inputs or outputs, and open or closed loop positioning modules. The I/O racks 17 and networks 15 employ conventional interface and communication technology. The remote I/O rack 17 also contains an adapter module 29; such as the one described in U.S. Pat. No. 4,413,319, which controls the transmission of data via the I/O network 15 between the I/O modules 19 and the scanner modules 20.

The system controller 16 is connected through cable 22 to a programming terminal 24, which is used to load the user programs into the programmable controller and configure its operation, as well as monitor its performance. The terminal 24 is a personal computer programmed to enable the user to develop the control programs on the terminal. The different programs are then downloaded into the programmable controller. Once the programs have been loaded into the programmable controller 10 and its operation debugged, the terminal 24 may be disconnected from the system controller 16 if further monitoring is not required. The system controller 16 may be also connected via a cable 26 to a local area network 28 over which it may receive data and programming instructions, as well as issue status information and report data to a host computer. This enables a central host computer or control terminal to program, control and monitor the operation of a plurality of programmable controllers on a factory floor.

During the course of carrying out a user control program, the program execution module 18 reads input status data from the input image tables in one or more of the I/O scanner modules 20. As called for by the program instructions, the program execution module also writes output state data to the output image table in the I/O scanning module 20 that services the respective output device. Access to the I/O tables is obtained via the rack backplane 11.

For a detailed description of the operation of such a programmable controller reference is made to U.S. patent application 07/089,587 Filed Aug. 26, 1987 entitled "Programmable Controller with Parallel Processors"

Figure 2:
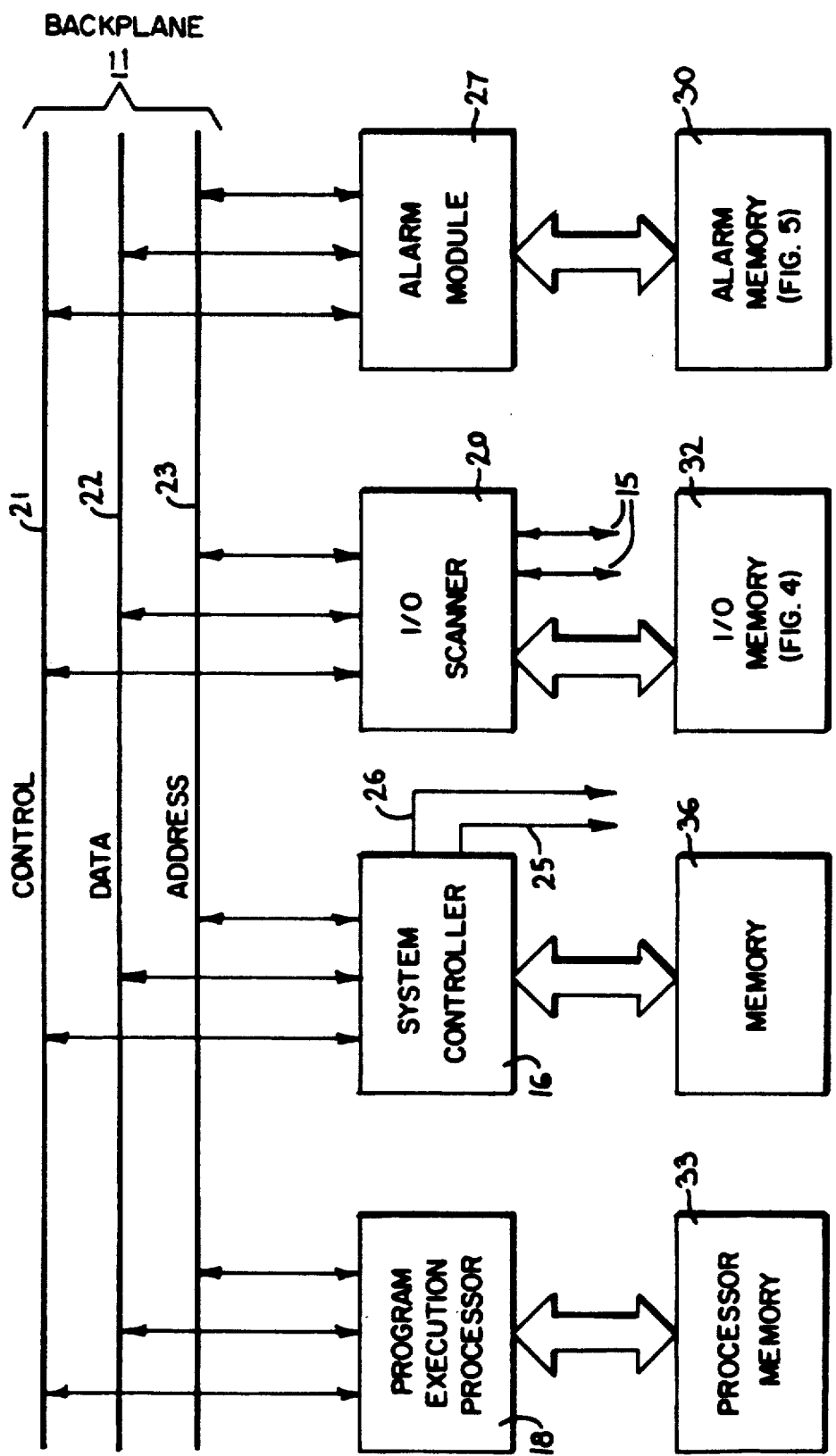
FIG. 2 is a schematic block diagram of the controller system shown in FIG. 1.

In order for the data and commands to be transferred among the modules of the programmable controller, the modules are interconnected as shown in FIG. 2. Each of the modules is connected to the rack backplane 11 which consists of separate control, data and address buses, 21-23 respectively. The control bus 21 consists of a number of separate lines to which a module may connect depending upon the control signals required for that type of module. The data bus 22 is thirty-two bits wide and the address bus is twenty-seven bits wide.

The modules of the programmable controller 10 will be described in detail in the following sections.

SYSTEM CONTROLLER

As noted previously, the system controller module 16 provides a communication interface for the programmable controller to external terminals and local area networks. The system controller 16 also performs system housekeeping functions, such as providing an indication of the system status and supervising access to the backplane 11.

During normal operation of the programmable controller, the system controller 16 takes care of communication with the external devices that are connected to it, such as network 28 and programming terminal 24. One of the significant tasks is communicating with the terminal 24 to provide information allowing the operator to monitor the system performance and to detect faulty sensors or actuators by means of the alarm module. The system module provides the alarm module with initialization data and controls the operating mode of the alarm module. Another task supervised by the system controller 16 is the exchange of data with a host computer or a peer programmable controller via the local area network 28. This enables the host computer to collect statistics from one or a number of programmable controllers regarding their operation. In addition to these functions, another function of the system controller 16 is to receive all programming changes and see to it that the user control program in the corresponding program execution module 18 is updated. For example, this includes adding, deleting and changing various rungs of the ladder program.

REMOTE I/O SCANNER MODULE

Figure 4:
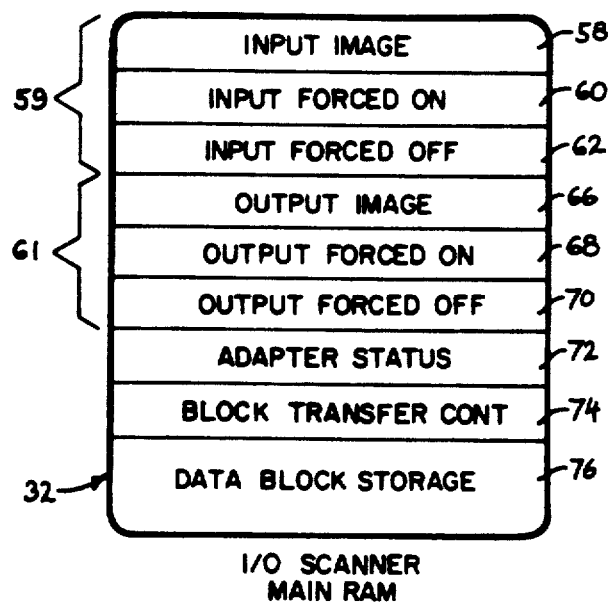
FIG. 4 is a diagram of the data structure stored in the I/O memory of FIG. 2.

As noted above, the I/O scanner modules 20 gather input sensor data for use by the program execution processor modules 18. Referring to FIG. 1, 2 and 4, a remote I/O scanner module 20 couples the programmable controller 10 to one or more remote input/output racks 17 containing individual I/O modules 19 which interface the sensors, or input devices, and actuators, or output devices, to the programmable controller 10. Each scanner module 20 periodically requests input data pertaining to the status of the input devices connected to the remote I/O racks 17 and stores it in the module's input image table section of its memory 32 for reading by other controller modules, such as the processor modules 18 and the alarm module 27. The scanner module 20 also contains an image table stored in its memory 32 which receives from other controller modules, such as the processor modules 18. At regular intervals the updated output data in the scanner module's output image table is transferred to the respective remote input/output racks 17 to control the various actuators connected to these racks.

FIG. 4 shows in detail the data structures stored in the main RAM 32 of each I/O scanner module 20. These data structures include the I/O image table for the remote sensors and actuators serviced by that module 20. The input image table 59 represents the sensor data and consists of three separate sections 58, 60 and 62. The first section 58 is the image of the actual state of the various sensing devices. The information relating to the inputs that are forced on is contained in the second section 60 within the input image table 59. As with previous programmable controllers, the user may force the status of a given sensor to appear to be either on or off regardless of its actual state. This enables the bypassing of faulty sensors, for example. Forced on sensors are designated by a binary one in an address for each such input.

The sensors that are forced off are indicated in the third section 62 of the input image table 59 by a logical zero stored for those sensors. Although by definition the user may write into the forced data tables 60 and 62, the user is prohibited from writing into the actual input image table 58. During the operation of the programmable controller, the user programs can read either the actual input image data from section 58 or the forced image of the sensor. If the forced image is read, the scanner module 20 logically OR's the actual sensor input state with the forced on data from section 60, then that result is ANDed with the forced off data for that sensor from section 62.

The output image table 61, also stored in the main RAM 32, includes the output image data table 66 which represents the status for the output devices connected to the remote I/O racks 17 serviced by the I/O scanner module 20. Typically, this output data is determined by the execution of the user control program in the processor module 18. A second section 68 representing the forced on output data and a third section 70 representing the forced off output data are also included in the output table 61. This allows the user to define a given actuator as always being on or off regardless of the results from the execution of the user control program. For example, this is useful where a portion of the controlled equipment may have to be shut down for maintenance and should not be turned on by the user control program. The control program may read each of the output tables 66, 68 and 70 individually. If the forcing of the output states is disabled, the data sent to the remote I/O racks 17 for activating or deactivating the various controlled devices is from the output image table 66. If output state forcing is enabled then the data sent to the remote I/O racks 17 is a logical combination of the three output tables 66, 68 and 70 using Boolean logic that is identical to the combination of the three input tables 58, 60 and 62 described above.

Referring still to FIG. 4, the data structure in the main RAM 32 of the I/O scanner module 20 also includes a block 72 that contains data regarding the status of the communication adapter in each of the remote I/O racks 17 serviced by the module 20. This data is used during the transfer of information over the I/O links 15 with those remote I/O racks. Although the state of most of the sensor and operating devices may be represented by a single binary bit, certain devices, such as position sensors and analog devices, produce or require information that comprises a plurality of digital words. These data may be transmitted to or from the remote I/O rack 17 into the I/O scanner module 20 as a large block of data. Memory section 74 in the main RAM 32 contains information necessary to control such transfers of blocks of data and a companion section 76 provides a memory area for the storage of the actual blocks of data. For a detailed description of this block transfer reference is made to U.S. Pat. No. 4,4133,319 entitled "Programmable Controller for Executing Block Transfer with Remote I/O Interface Racks".

Figure 3:
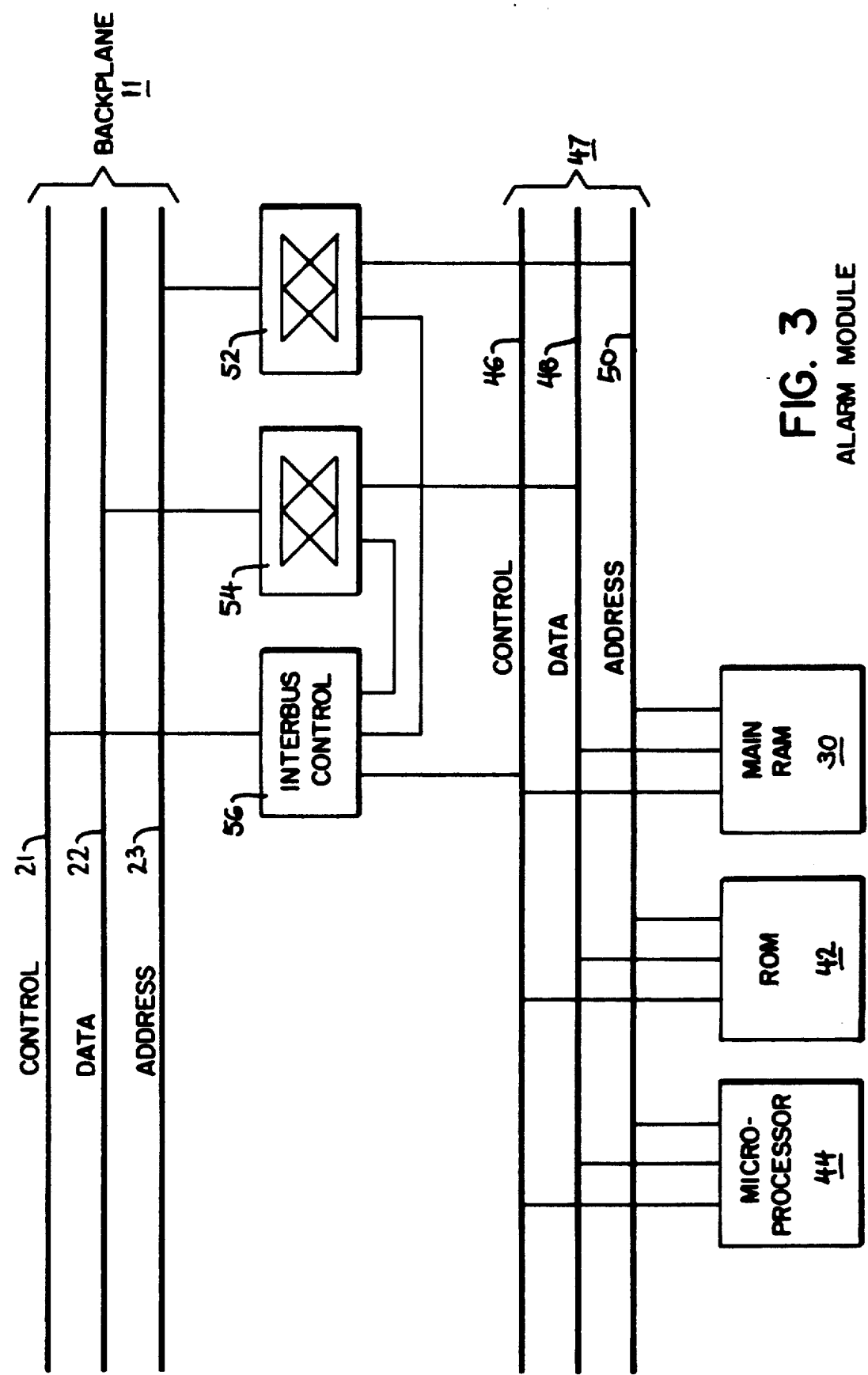
FIG. 3 is a schematic block diagram of the alarm module shown in FIG. 2.

Referring to FIGS. 1, 2, and 3, an alarm module 27 connects to the backplane 11 so as to be able to receive and transmit data to and from the system controller 16 and the I/O scanner 20. In particular, the alarm module 27 receives control data from the system controller 16 and transmits alarm status data to the system controller 16. The alarm module reads data from the I/O scanner image tables contained in RAM 32 as described above.

Referring specifically to FIG. 3, each alarm module 27 connects to the three backplane buses 21-23. The alarm module contains an internal bus 47 comprising a control bus 46, and address bus 50 and a data bus 48. The internal bus 47 is connected to backplane 11 by address bus gates 52 and data bus gate 54. Both of these transmission gates are controlled by an inter-bus control circuit 56 which sends signals to the gates 52 and 54. A local random access memory ("RAM") 30 is coupled to the internal bus 47. It stores the various flags and data words used by the alarm module 27 and provides the storage needed to implement the CAM memory 80.

Figure 5:
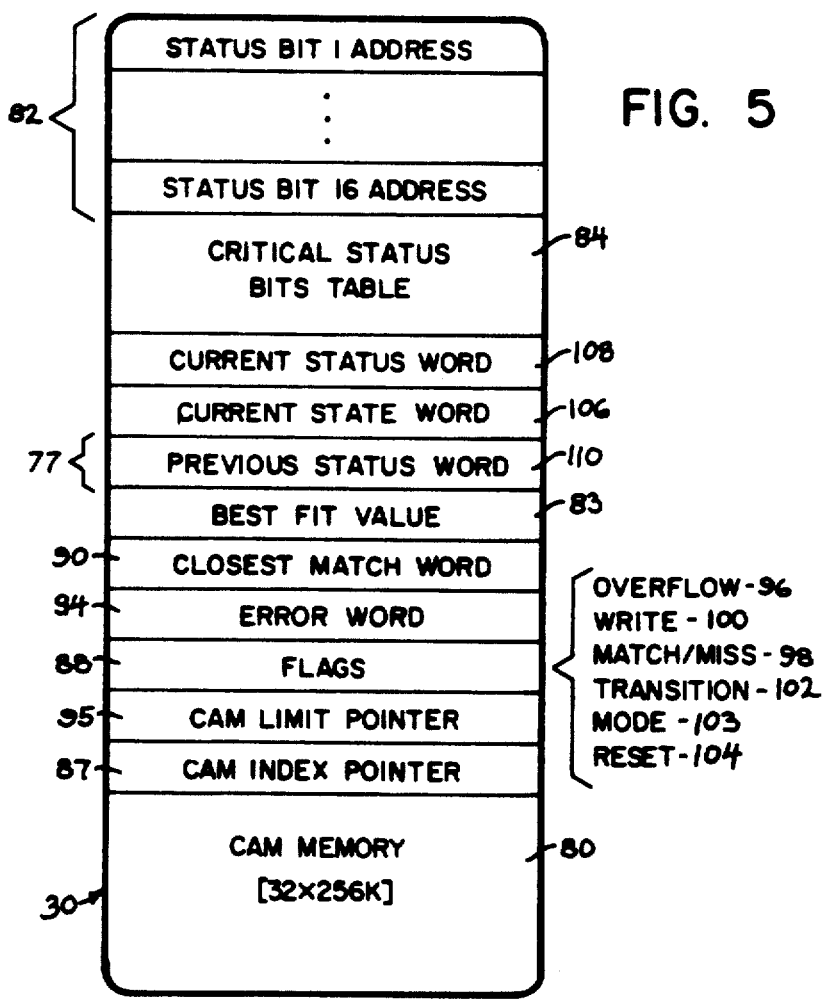
FIG. 5 is a diagram of the data structure stored in the alarm module memory of FIG. 2.

FIG. 5 shows in detail the data structure stored in the RAM 30 of the alarm module 27. The addresses required for accessing status bits from I/O scanner RAM 32 are stored in area 82. Sixteen such addresses are required to form the current status word 108. The largest section of the RAM 30 is occupied by the CAM 80 storage. These and other data structures will be described in more detail in the operation section below.

Referring again to FIG. 3, a microprocessor 44 is also coupled to internal bus 47. The processor is a 32-bit processor such as the 68020 manufactured by Motorola, Inc. which can rapidly, access the 32-bit CAM words which must be searched during the operation of the alarm Module 27. A read only memory ("ROM") 42 is also attached to the internal bus 47 and it contains the program executed by the microprocessor 44 during operation of the alarm module 27. The operation fo the alarm module 27 will now be described by referring to these programs and the manner in which they are executed.

Alarm Operation

Initialization

Prior to the operation of the ALARM 27, the operator, though the system controller 16 must identify up to 16 related status bits and their locations in the I/O scanner RAM 32. As mentioned above, these bits are selected to best identify each state of the process being controlled. For example, the bits may be selected from the input image table 58 of the I/O RAM 32.

In certain instances, status bits selected from the input image table 58 will be redundant with other selected status bits for reliability purposes. Or, the input selected will not be critical to the functioning of the process for other reasons. The operator may also identify such redundant and non-critical bits in the critical status bit table, 84, shown in FIG. 5. The critical status bit table 84 is organized as a 16 word array, each word corresponding to a single status bit. The contents of each word is the address of the corresponding redundant status bit for use by the system controller if an error is detected, as will be described below. If the address contained in the word is zero, the associated bit is considered redundant or noncritical.

RUN Mode

Figure 7:
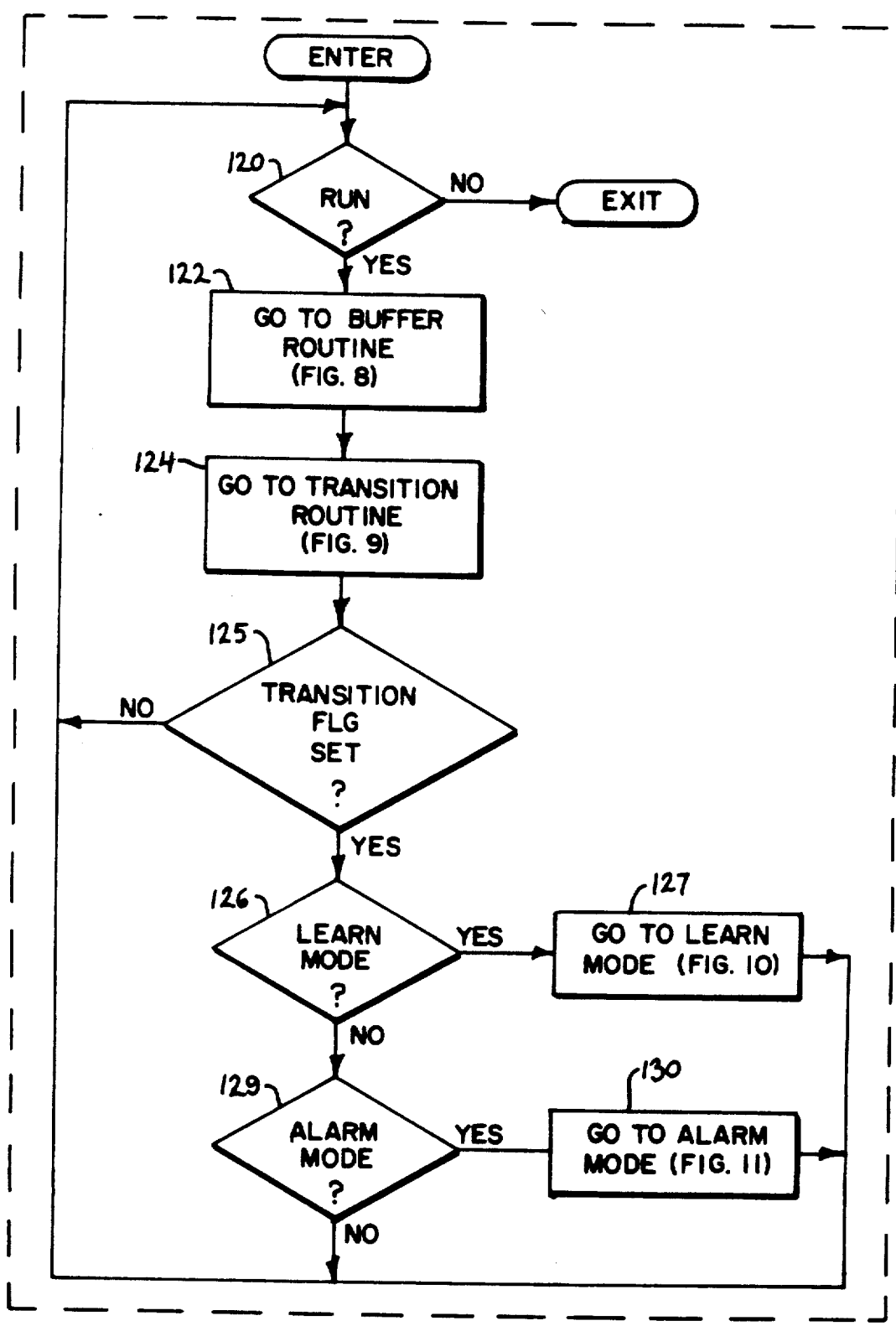
FIG. 7 is a flow chart of the main program executed by the alarm module microprocessor of FIG. 3.

The alarm module may be in one of three modes: WAIT, LEARN or ALARM as indicated by mode flag 103 stored in alarm module RAM 30 and written to by the system controller 16. The LEARN and ALARM modes are referred to herein collectively as the "RUN" mode. Referring to FIG. 7, which is a general overview of the alarm module operation, during the first step of the main program, at process block 120, the microprocessor 44 interrogates the mode flag 103 to determine whether the alarm module 27 is in the WAIT mode or alternatively in the LEARN or ALARM mode. If the system controller 16 has set the mode flag 103 to LEARN or ALARM, the processor 44 proceeds to the buffer routine indicated at process block 122 which will be described in detail below. Generally the buffer routine collects the status bits into a status word 108 as described above.

Upon return from the buffer routine, the transition routine is called, shown in process block 124 and described further below. The transition routine determines whether there has been a change in one or more status bits and, if so, sets the transition flag 102. If not, the program loops to process block 120 by virtue of the test of the transition flag 102 (FIG. 5) at process block 125.

If the transition flag 102 is set, the mode flag 103 is again examined in process block 126 to determine if the alarm module 27 is in the LEARN mode. If it is, the program jumps to the LEARN routine as indicated at process block 127 as described below.

If the alarm module is not in the LEARN mode the program proceeds to process block 129 where the mode flag 103 is tested to see if the module is in the ALARM mode. If it is, the program jumps to the alarm routine, as indicated by process block 130. In any case, the system loops back to decision block 120 to repeat the process on a continuous basis during the operation of the programmable controller 10.

Buffer Routine

Figure 9:
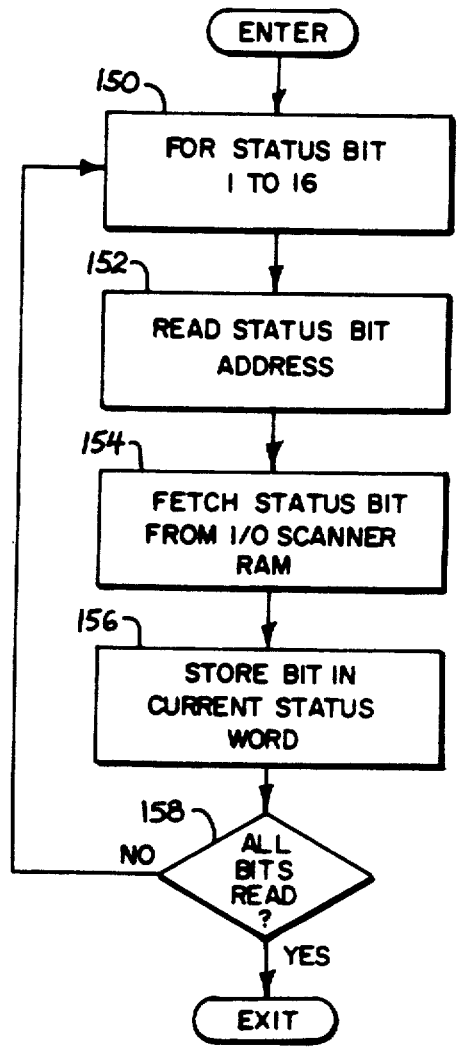
FIG. 9 is a flowchart of the buffer routine called by the main program of FIG. 7 and executed by the microprocessor of FIG. 2.

Referring to FIGS. 5 and 9, the buffer routine is a loop which accumulates each bit of the current status word 108 by repeatedly executing its steps 150-156. Steps 150 and 158 together control the number of cycles through this loop, which is 16 in the preferred embodiment. A step 152, within this loop, fetches the appropriate status bit address from section 82 of the RAM 30 and at step 154 the particular status bit is read from the input or output image table 58 or 66 of the I/O scanner through the controller backplane. At step 158 the status bit is placed in the current status word location 108 in RAM 30. When all sixteen current status bits have been obtained, the routine exits back to the main program.

Transition Detector

Figure 8:
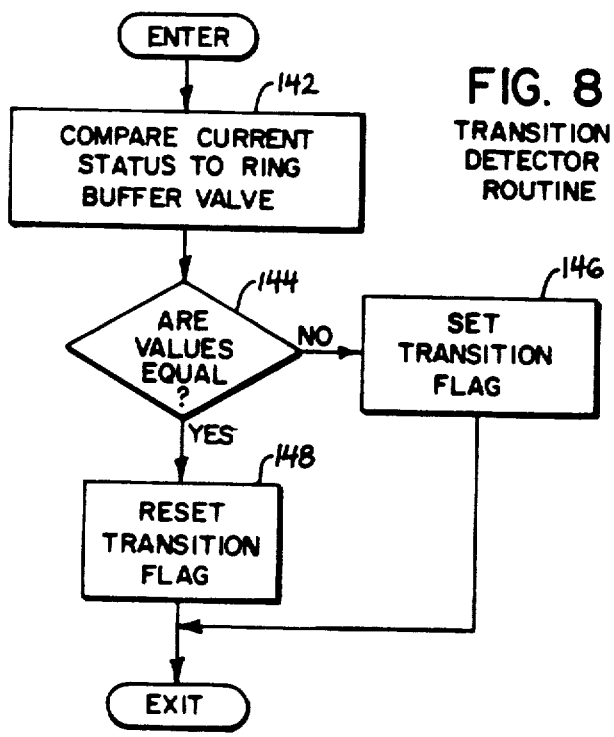
FIG. 8 is a flowchart of the transition detector routine called by the main program of FIG. 7 and executed by the microprocessor of FIG. 2.

Referring particularly to FIGS. 5 and 8, the first step of the transition detector routine indicated at process block 132 is to compare the current status word located at RAM location 108 in RAM 30.

The previous status word 110 and the current status word 108 are compared by inverting each bit of the previous status word 110 and logical ANDing the result with the current status word 108. This result is tested for zero at process block 144 to determine if the current status word is equal to the last status word. If they are unequal, the transition flag 102 is set at process block 146 indicating that there has been a transition. If they are equal, the transition flag 102 is reset at process block 148 indicating that no transition has occurred.

LEARN Mode

Figure 10:
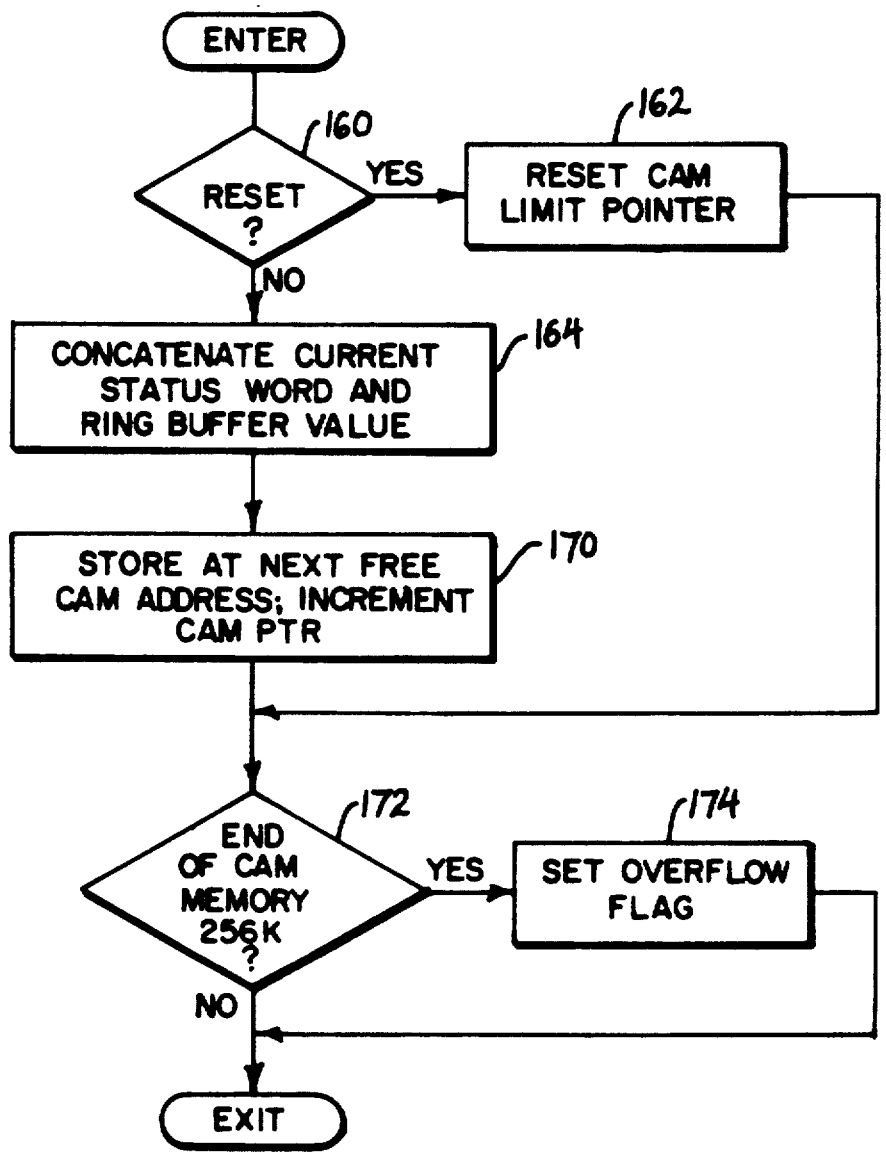
FIG. 10 is a flowchart of the LEARN mode routine called by the main program of FIG. 7 and executed by the microprocessor of FIG. 2.

Referring to FIGS. 5 and 10, the first step of the LEARN mode routine is the examination of the reset flag 104 to determine if the CAM limit pointer 95 should be reset at process block 162. The CAM limit pointer 95 indicates the last filled CAM address. The reset flag 104, as set by the system controller 16, therefore effectively erases the CAM 80 by indicating that the last filled address, hence the first available address, is at CAM 80 address zero.

If the CAM limit pointer 95 is not to be reset, the current status word 108 and the previous status word 110 are concatenated at process block 164 so that the current status word makes 108 up the least significant bits and the previous status word 110 makes up the most significant bits of the 32-bit state word 106. As indicated by process block 170, this state word 106 is stored in the CAM memory section 80 of the RAM 30 at the next available address as indicated by the CAM limit pointer 95. The CAM limit pointer 95 is then incremented by one as indicated by process block 171. At process block 172, the CAM limit pointer is tested to see if all 256 k of CAM 80 memory has been exhausted. If it has, as indicated by a CAM 80 limit pointer value of 256 k or higher, the overflow flag 96 is set, at process block 174 signalling the system controller 16 to terminate LEARN mode. In either case, the program then exits back to the main program.

ALARM Mode

Figure 11:
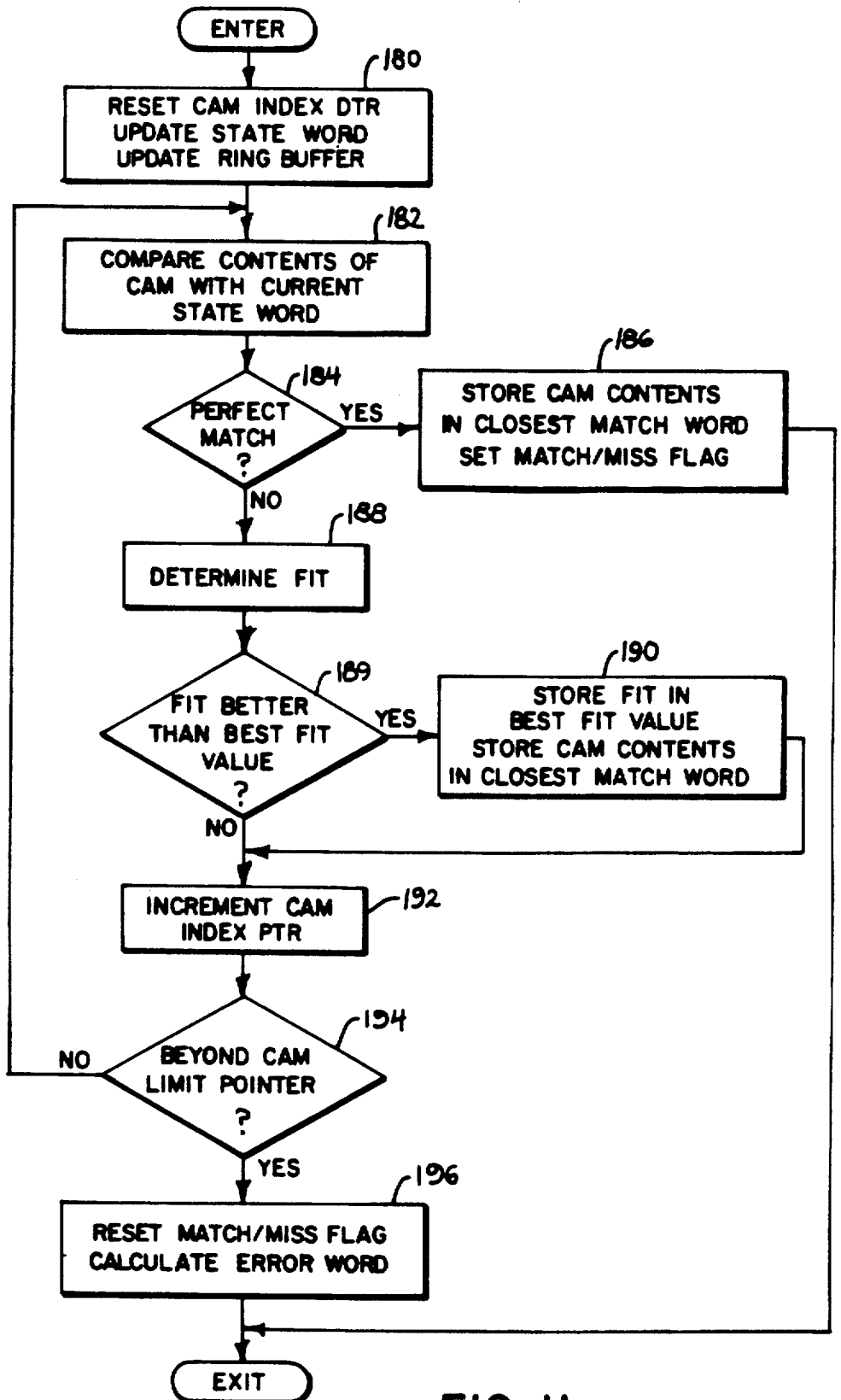
FIG. 11 is a flowchart of the ALARM mode routine called by the main program of FIG. 7 and executed by the microprocessor of FIG. 2.

Referring to FIGS. 5 and 11, the first step of the ALARM mode routine, indicated at process block 180 is to reset the CAM index pointer 87. The current status word 108 and the previous status word 110 are then concatenated as described above to form the current state word. The current status word 108 is then transferred to the previous status word 110 location in the ring buffer location 77 of RAM 30. The contents of the CAM 80 address pointed to by CAM index pointer 87 is then compared with the current state word 106 and tested for a perfect match at process blocks 182 and 184. If there is a perfect match, then the match/miss flag 28 is set and the current state word 106 is stored in RAM 30, as the closest match word 90. If there is no match between the contents of the current CAM address and the state word 106 then the "fit", i.e. how closely the two words match, is measured at process block 188. There are many ways in which fit may be defined, and in the preferred embodiment fit is measured by counting the number of bits "set" in the result obtained from complimenting the conjunction of the current state word 106 and the current CAM address contents. This yields a fit number between 1 and 32 where 1 is the closest-match and 32 is no match. If the fit of the current CAM address contents is better than the previously best fit number stored at RAM 30 location 83 then at process block 190 the later and lower fit number replaces the previous fit number and the current CAM contents for that fit is stored at RAM location 90 to identify the closest-match thus far.

Provided no perfect match is obtained, the CAM index pointer is incremented at process block 192 and process blocks 182-190 are repeated for all CAM addresses as detected at decision block 194. After the entire CAM memory 80 has been searched for a match, the match/miss flag 98 is reset, and error word 94 is calculated at process block 195. The error word 94 is calculated by complimenting the closest match word logical ANDed to the current state word to produce an error word stored at memory location 94. The bits in this error word indicate the bits that did not match between the current state word 106 and the closest match word 90.

ALARM Service

Figure 12:
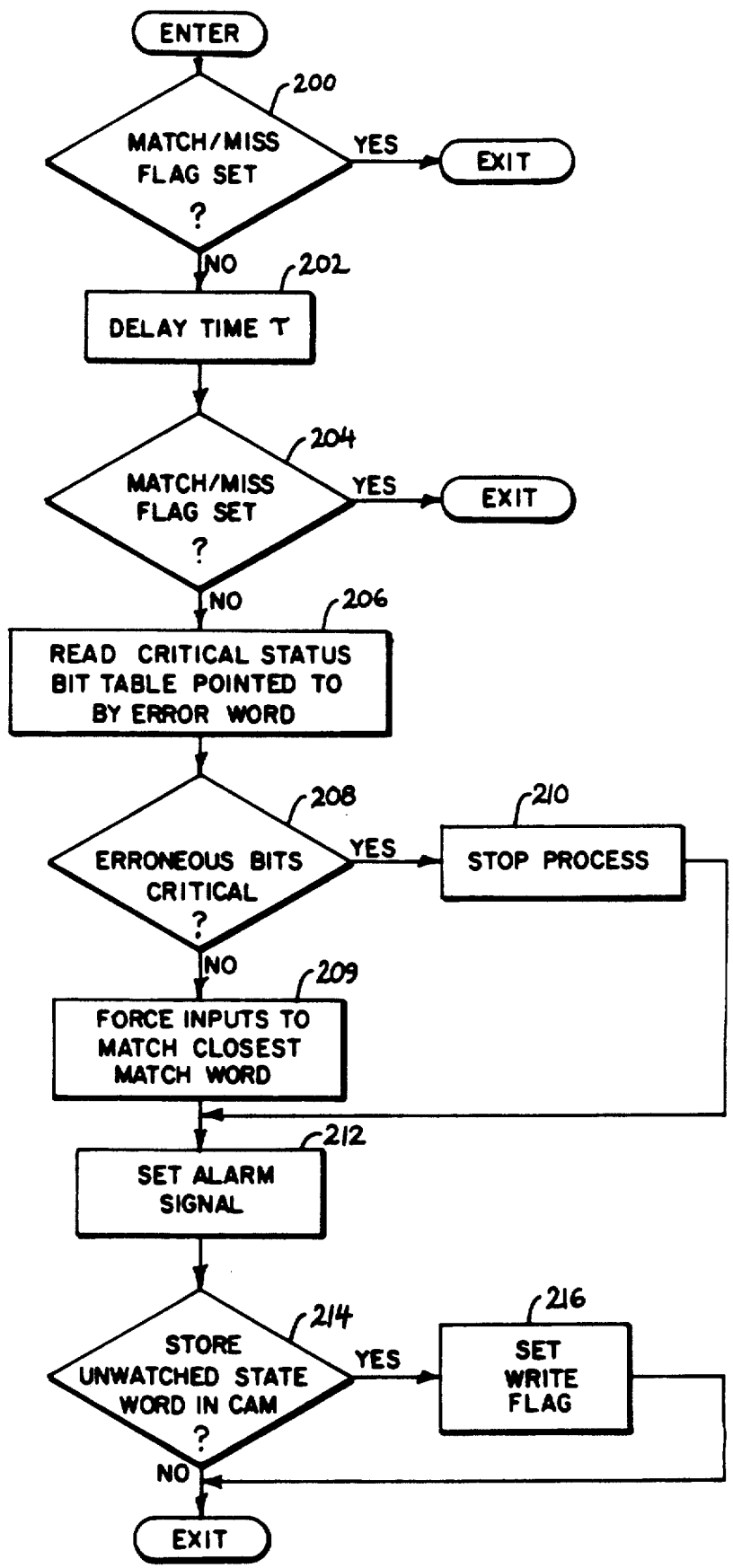
FIG. 12 is a flowchart of the alarm service routine called by the main program of FIG. 7 and executed by the microprocessor of FIG. 2.

The alarm service routine is executed by the system controller 16. Although the alarm service routine may be executed on an interrupt driven basis as triggered by the match/miss flag 103, in the preferred embodiment, the alarm service routine is executed repetitively by the system controller 16 in series with its other tasks. Referring to FIGS. 5 and 12, when the system controller 16 detects a transition of the match/miss flag 98 at process block 200, indicating a "miss" during ALARM mode, a timer is started at process block 202 after which the match/miss flag 23 is again checked at process block 204. The timer's delay value t may be set by the operator and serves the purpose of eliminating false "miss" signals caused by temporary state errors from propagation delay or asynchronous input switching. If the match/miss flag 98 remains reset after this time delay, then at process block 206 the error bits are identified by reading and examining the error word 94 and the set bits are identified as fatal or non fatal by reference to the critical status bits table 84 stored in the alarm module RAM 30. A bit error is considered fatal if the bit has no corresponding, redundant status bit, or if the bit is critical as indicated in the critical status bits table 84.

An error in any individual state bit corresponding to a particular status bit may have varying significance depending on the process being controlled. In the case where inputs to the process controller are redundant or non-critical, a failure of one or more status bits may not require that the process be stopped. If the error bits are considered fatal, per process block 208, then the process is halted or moved to a predefined "safe position". If the error bits are not fatal, then the process continues by forcing the inputs to match the closest match word as indicated by process block 209. In such cases the industrial controller may revert to a more conservative, contingency control program to accommodate the possible input failure. The forcing "on" or "off" of input status bits, to match the closest match word, is performed by setting bits in the "input forced on" or "input forced off" tables 60, and 62 in the I/O scanner main RAM 32 as was described earlier. In all cases, the operator is alerted by means of an alarm signal as indicated in process block 212.

In either case, the operator has the option of adding the particular state in question to the CAM 80, thereby fine-tuning the CAM contents in the event that the state properly should be contained within the CAM 80 This is performed by the system controller 16 which may write the new state to the CAM.80 by setting write flag 100 per process block 216.

A preferred embodiment of the invention has been described, but it should be apparent to those skilled in the art that many variations can be made without departing from the spirit of the invention. For example the state of the process controller may be defined by additional status bits and and status words for additional or fewer previous status transitions. The identification of closest-matches by the CAM may be the subject of different rules including those which assign differing weights to the various status bits. Also, more sophisticated correction processes may be used, upon detection of status bit errors, depending on the type of process controlled. A single alarm module may also be supplemented with additional alarm modules each associated with a particular set of I/O modules and coordinated by the system controller 16.

Additional error detection capability may be added by including with each state word a time value that indicates the maximum length of time of the state. This procedure would enable the alarm to detect "stuck" bits whose failure otherwise would prevent the detection of a transition.

I claim:

1. A heuristic error correction system for an industrial controller with multiple inputs and outputs for controlling a process having at least one process state comprising:
   input means for receiving certain of the multiple inputs and outputs from the industrial controller as status input signals;
   a transition detector means coupled to the input means for collecting the status input signal into a state word and for detecting changes in the process state as indicated by changes in the state word;
   a content addressable memory receiving the state word from the transition detector and responsive to changes in the state word indicated by the transition detector and, in a learn mode, for storing the state word and, in an alarm mode, for identifying whether the state word has been previously stored and if not for producing a miss signal;
   signal means for receiving the miss signal from the content addressable memory and for signalling when the heuristic error correction system is in the alarm mode and the state word cannot be identified as previously stored; and
   a correcting means responsive to said signal means for changing the multiple inputs to the industrial controller so that ht estate word conforms to a stored state word.

2. The heuristic error correction system of claim 1 wherein the correcting means change the multiple inputs to conform the state word to that stored state word requiring the fewest changes in the multiple inputs.

3. The heuristic error correction system of claim 1 including a user-defined critical status input table communicating with the correcting means and the industrial controller and identifying the status input signals causing the state word not to match a stored state word and stopping the process if the identified status input signals are in the critical status input table.

* * * * *

UNITED STATES PATENT AND TRADEMARK OFFICE
CERTIFICATE OF CORRECTION

PATENT NO. : 5,089,984

DATED : February 18, 1992

INVENTOR(S) : Struger et al.

It is certified that error appears in the above-identified patent and that said Letters Patent is hereby corrected as shown below:

Col. 3, line 29          "detector 04" should be "detector 104".

Col. 12, line 40         "so that ht estate" should be "so that the state word"

Signed and Sealed this

Eighth Day of June, 1993

Attest:

MICHAEL K. KIRK

Attesting Officer         Acting Commissioner of Patents and Trademarks